US012631314B2

(12) United States Patent
Zhang

(10) Patent No.: US 12,631,314 B2
(45) Date of Patent: May 19, 2026

(54) ILLUMINATING DEVICE

(71) Applicant: YLX INCORPORATED, Shenzhen (CN)

(72) Inventor: Quan Zhang, Shenzhen (CN)

(73) Assignee: YLX INCORPORATED, Shenzhen (CN)

(*) Notice: Subject to any disclaimer, the term of this patent is extended or adjusted under 35 U.S.C. 154(b) by 0 days.

(21) Appl. No.: 19/123,652

(22) PCT Filed: Aug. 4, 2023

(86) PCT No.: PCT/CN2023/111152

§ 371 (c)(1),
(2) Date: Apr. 23, 2025

(87) PCT Pub. No.: WO2024/098853

PCT Pub. Date: May 16, 2024

(65) Prior Publication Data

US 2026/0110419 A1 Apr. 23, 2026

(30) Foreign Application Priority Data

Nov. 8, 2022 (CN) ........................ 202222985504.6

(51) Int. Cl.
*F21V 14/04* (2006.01)
*F21V 9/32* (2018.01)

(52) U.S. Cl.
CPC ................ *F21V 14/04* (2013.01); *F21V 9/32* (2018.02)

(58) Field of Classification Search
CPC .................... F21V 9/30-45; F21V 14/00-085
See application file for complete search history.

(56) References Cited

U.S. PATENT DOCUMENTS 10,712,647 B2 * 7/2020 Kawasumi ........... H04N 9/3161
2010/0309439 A1 12/2010 Bi et al.

FOREIGN PATENT DOCUMENTS

CN 102662301 A 9/2012
CN 104456429 A 3/2015

(Continued)

OTHER PUBLICATIONS

International Search Report for Application No. PCT/CN2023/111152 mailed Dec. 8, 2023.

*Primary Examiner* — Jason M Han
(74) *Attorney, Agent, or Firm* — MARSHALL, GERSTEIN & BORUN LLP; Michael P. Furmanek

(57) ABSTRACT

An illuminating device, comprising a hybrid light source, a first converging element, an adjusting mechanism, a light concentrating mechanism and a GOBO. The hybrid light source comprises a first light source and a second light source. The first light source is configured for generating a first light, and the second light source is configured for generating a second light. The first converging element is arranged in an optical path of the first light and an optical path of the second light. The light concentrating mechanism is arranged on the adjusting mechanism configured for adjusting the position of the light concentrating mechanism. The light concentrating mechanism is located in the optical path of the second light passing through the first converging element or located out of the optical path of the first light passing through the first converging element. The first light is transmitted to the GOBO through the first converging element, or the second light is transmitted to the GOBO through the first converging element and the light concentrating mechanism. The first light and the second light of the present disclosure pass through the first converging element, and then are focused on the GOBO to form an illumination light spot having high luminous flux and high illumination, (Continued)

thereby meeting the requirements of high illumination and high luminous flux output, and facilitating wide application of the illuminating device.

8 Claims, 2 Drawing Sheets

(56) References Cited

FOREIGN PATENT DOCUMENTS

| | | | |
|---|---|---|---|
| CN | 205350946 | U | 6/2016 |
| CN | 110748805 | A | 2/2020 |
| CN | 216591181 | U | 5/2022 |
| CN | 219389500 | U | 7/2023 |

* cited by examiner

ILLUMINATING DEVICE

CROSS-REFERENCE TO RELATED APPLICATIONS

This is the United States national phase of International Patent Application No. PCT/CN2023/111152, filed on Aug. 4, 2023, which claims priority to Chinese Patent Application No. 202222985504.6, filed on Nov. 8, 2022, the entire contents of each of which are hereby incorporated by reference herein

TECHNICAL FIELD

The present disclosure relates to the technical field of illumination, and in particular to an illuminating device.

BACKGROUND

At present, in the field of illuminating, a light-emitting diode (LED), is one of the most advanced lighting materials. Compared with traditional incandescent lamps and energy-saving lamps, LED illumination can save electricity power by a percentage from 50% to 70%. Therefore, as an efficient and energy-saving light source in the field of solid-state lighting, the LED illumination is gradually replacing traditional lighting technology. However, with the demands of people in the field of ultra-high-power ultra-highlight illumination, such as the fields of aerospace, projection display and automotive headlights, a new generation of laser illumination technology emerges.

Compared with the laser illumination technology, the LED light source is formed by arranging a plurality of LED light-emitting chips in an array, thereby resulting in a higher luminous flux. However, due to the fact that the LED chips emit Lambertian light, which radiates light in various directions, so that the light in each direction is not concentrated enough, thereby resulting in low illumination and low illuminance. The laser light source has good light collimation. The laser beam is almost linearly propagated, with small irradiation area and high illumination. Therefore, it is urgent to provide an illuminating device with high luminous flux and high illumination.

SUMMARY

In order to solve the above problems in the related art, the present disclosure provides an illuminating device with high luminous flux and high illumination.

In order to solve the technical problems existing in the related art, the present disclosure provides an illuminating device, including a first light source, a second light source, a first converging element, an adjusting mechanism, a light concentrating mechanism and a goes before optics (GOBO). The first light source is configured to generate a first light. The second light source is configured to generate a second light. The first converging element is arranged in an optical path of the first light and an optical path of the second light. The light concentrating mechanism is arranged on the adjusting mechanism. The adjusting mechanism is configured to adjust a position of the light concentrating mechanism. The light concentrating mechanism is located in the optical path of the second light passing through the first converging element or located out of the optical path of the first light passing through the first converging element. The first light is transmitted to the GOBO through the first converging element, or the second light is transmitted to the GOBO through the first converging element and the light concentrating mechanism.

In an embodiment, the illuminating device includes a light homogenizing mechanism arranged between the first light source and the first converging element, and the first light sequentially passes through the light homogenizing mechanism and the first converging element.

In an embodiment, the adjusting mechanism is configured to adjust the light concentrating mechanism to be located out of an optical path of the beam passing through the first converging element, so that the beam sequentially passes through the light homogenizing mechanism and the first converging element, and then is transmitted to the GOBO.

In an embodiment, the adjusting mechanism includes an adjusting knob and a rotating shaft. The adjusting knob is fixed to the rotating shaft. The adjusting knob is configured to drive the rotating shaft to rotate, so that the light concentrating mechanism is located in the optical path of the second light or located out of the optical path of the first light.

In an embodiment, the extension direction of the rotating shaft is perpendicular to the transmission direction of the light.

In an embodiment, the first light is irradiated to the GOBO to form a first light spot. The first light is irradiated to an output surface after passing through the GOBO to form a second light spot. A shape of the second light spot is different from that of the first light spot.

In an embodiment, the first light source includes a substrate and a light-emitting chip. The light-emitting chip is arranged on the substrate. The substrate is provided with a through hole. The second light is transmitted to the GOBO via the through hole.

In an embodiment, the illuminating device includes a wavelength conversion element. The wavelength conversion element is arranged on the substrate via the through hole and is configured to convert the second light with a first wavelength into the second light with a second wavelength.

In an embodiment, the adjusting mechanism is configured to adjust the light concentrating mechanism to be located in the optical path of the second light passing through the first converging element, so that the second light sequentially passes through the first converging element and the light concentrating mechanism, and then is transmitted to the GOBO.

In an embodiment, the hybrid light source includes a collimating mechanism arranged between the first light source and the first converging element. The collimating mechanism has a focal plane in the optical path of the first light and/or the second light. The collimating mechanism is configured to adjust a divergence angle of the first light and/or the second light.

Compared with the related art, the illuminating device according to the present disclosure utilizes the first light source to generate the first light, and utilizes the second light source to generate the second light. The adjusting mechanism adjusts the light concentrating mechanism to be in the optical path of the second light emitted by the first converging element or out of the optical path of the first light, so that the first light and the second light pass through the first converging element and then are focused on the GOBO, and form the lighting light spots with high luminous flux and high illuminance. The illuminating device can satisfy the requirements of output with high illuminance and high luminous flux, which is beneficial to wide application of the illuminating device.

It should be understood that the foregoing general description and the following detailed description are merely exemplary and explanatory, and do not limit the present disclosure.

BRIEF DESCRIPTION OF DRAWINGS

In order to more clearly describe the technical solutions of embodiments of the present disclosure, the drawings required for illustrating embodiments will be briefly introduced as below. It is appreciated that, the drawings described below are merely some embodiments of the present disclosure, and for those skilled in the art, other drawings can also be obtained based on these drawings without any creative effort.

DESCRIPTION OF EMBODIMENTS

Figure 1:
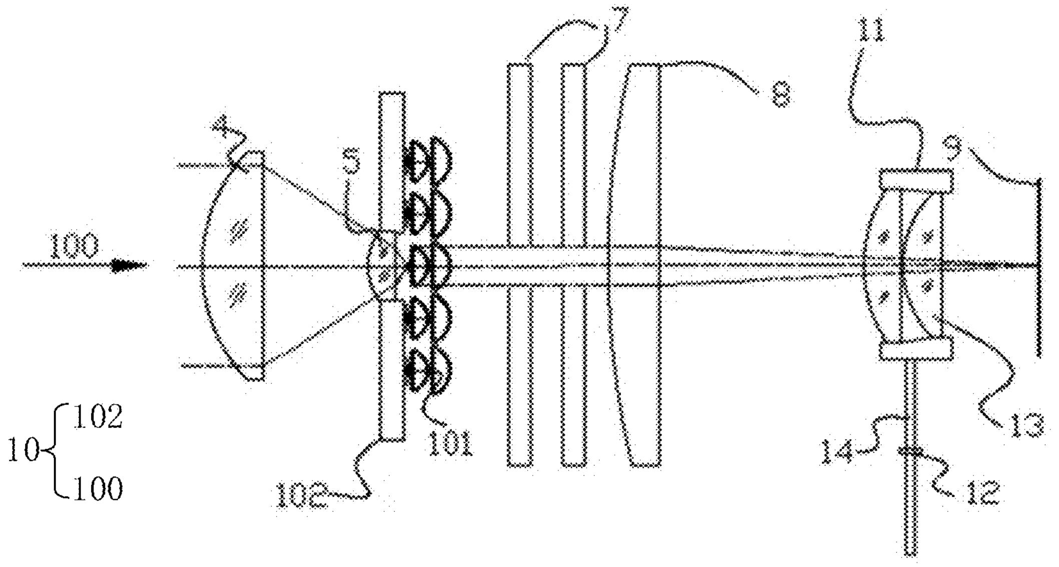
FIG. 1 is a schematic structural diagram of an illuminating device according to an embodiment of the present disclosure.

The following further describes the present disclosure in detail with reference to the accompanying drawings and embodiments. It should be noted that these following embodiments are just used to illustrate the present disclosure, rather than limit the scope of the present disclosure. Likewise, these following embodiments are just some, but not all, of embodiments of the present disclosure, and all other embodiments obtained by those skilled in the art without creative efforts shall fall within the protection scope of the present disclosure.

The wording "embodiments" mentioned herein means that particular features, structures or characteristics described with reference to embodiments can be included in at least one embodiment of the present disclosure. The wording appearing in different places of the specification neither necessarily refers to a same embodiment, nor refers to separate or alternative embodiments that are mutually exclusive with other embodiments. It should be explicitly and implicitly understood by those skilled in the art that these embodiments described herein can be combined with other embodiments.

In the description of the present disclosure, it should be noted that, unless otherwise specified and limited, the terms "install", "provide", "communicate", and "connect" should be understood broadly. For example, it may be a fixed connection, a detachable connection, or an integral connection, it may also be a mechanical connection or an electrical connection, or may be a direct connection or may be connected at intervals through an intermediate medium. For those skilled in the art, all directional indications in embodiments of the present disclosure (such as upper, lower, left, right, front, and back) are merely used to explain a relative position relationship, a motion status, and the like between components in a certain posture (as shown in the figure). If the specific posture changes, the directional indication changes accordingly.

For ease of understanding, some definitions in the present disclosure are explained as follows.

Luminous flux: the total amount of visible light emitted by the light emitter.

Illumination: the amount of incident light per unit area.

At present, among the mainstream lamps, as the cost of light emitting diodes LED is reduced and the efficiency is improved, high-power LED light sources have been widely used in the lighting field. The high-power LED light source is generally composed of a plurality of LED chips as well as LED chip arrays combined at a certain distance, so that the luminous flux of the high-power LED light source is relatively large. However, the disadvantage is that the illuminance of the LED is relatively low when the lamp lens outputs.

In professional lighting scenes such as stage lighting, high-power laser is generally used as the light source. The illuminance output by the high-power laser is very high, and compared with the existing LED technology, the illuminance output by the laser is unparalleled.

In view of this, the present disclosure provides an illuminating device. The illuminating device may combine a small-angle light source such as a laser light source and an LED light source into a hybrid light source, so that the illuminating device satisfies both requirements for illuminance and luminous flux. The illuminating device may be applied to an illumination scene with various requirements. The illumination scene includes, but is not limited to, home, guest, stage, and the like.

FIG. 1 is a schematic structural diagram of an illuminating device according to an embodiment of the present disclosure. As shown in FIG. 1, the illuminating device according to an embodiment of the present disclosure includes a hybrid light source 10, a first converging element 8, an adjusting mechanism 11, a light concentrating mechanism 13 and a GOBO 9.

The hybrid light source 10 is configured to generate light beams. The hybrid light source 10 includes, but is not limited to, a light source using a LED as a light emitter, an electric light source that use xenon discharge to emit light, a light source using a fluorescent substance as a light emitting material, a light source using an organic light-emitting diode, OLED, as a light emitter, and the like. The hybrid light source 10 at least includes a first light source 102 with high luminous flux and a second light source 100 with high illuminance. The first light source 102 may be an LED or an OLED light source. The second light source 100 may be a high-intensity gas discharge light source such as a short arc xenon lamp or an ultra-high pressure mercury lamp. The second light source 100 may also be a laser light source. The combination of the first light source 102 and the second light source 100 enables the illuminating device to have the characteristics of high illuminance and high luminous flux.

In an embodiment, the first converging element 8 is arranged in the optical paths of the first light and the second light, and is configured to converge the light beams emitted by the hybrid light source 10 onto the GOBO 9 or onto an output surface of the illuminating device. The light concentrating mechanism 13 is arranged on the adjusting mechanism 11. The adjusting mechanism 11 is configured to adjust the position of the light concentrating mechanism 13, so that the light concentrating mechanism 13 is located in the optical path of the second light emitted through the first converging element 8 or out of the optical path of the first light emitted through the first converging element 8. The first light is transmitted to the GOBO 9 through the first converging element 8, or the second light is transmitted to the GOBO 9 through the first converging element 8 and the light concentrating mechanism 13.

In an embodiment, the first converging element 8 is located between the hybrid light source 10 and the GOBO 9. The first light source 102 is located between the second light source 100 and the first converging element 8. The adjusting mechanism 11 and the light concentrating mechanism 13 are located between the first converging element 8 and the GOBO 9. The adjusting mechanism 11 is configured to adjust the position of the light concentrating mechanism 13, so that the light concentrating mechanism 13 can be located in or out of an optical path of the beam. It can be understood that, in an embodiment, is the first converging element 8, the light concentrating mechanism 13 and the GOBO 9 are sequentially provided in the optical path of the beam emitted by the hybrid light source 10. In another embodiment, the first converging element 8 and the GOBO 9 are sequentially provided in the optical path of the beam emitted by the hybrid light source 10. According to the lighting purpose and the like of the illuminating device, the position of the light concentrating mechanism 13 can be adjusted through the adjusting mechanism 11, so that the light concentrating mechanism 13 is located in the optical path of the beam, thereby improving the brightness of light spots output by the illuminating device. When there is no brightness requirement for the illuminating device, the light concentrating mechanism 13 can also be adjusted to be located out of the optical path of the beam.

Further, the illuminating device may include at least three illuminating modes. The first illuminating mode uses the first light source 102 as the main light source. In this case, the position of the light concentrating mechanism 13 is adjusted by the adjusting mechanism 11 to be located out of the optical path of the first light, and the first light is directly projected onto the GOBO 9 without passing through the light concentrating mechanism 13, so as to output illumination light with high luminous flux. The second illuminating mode uses the second light source 100 as the main light source. In this case, the position of the light concentrating mechanism 13 is adjusted by the adjusting mechanism 11 to be located in the optical path of the second light, and the second light is focused onto the GOBO 9 after passing through the light concentrating mechanism 13 and the first converging element 8, so as to form illumination light with high illuminance and high intensity. The third illuminating mode uses both the first light source 102 and the second light source 100 as the main light source. In this case, the optical path of the first light emitted through the first converging element 8 does not coincide with the optical path of the second light emitted through the first converging element 8, and the position of the light concentrating mechanism 13 is adjusted by the adjusting mechanism 11 to be located out of the optical path of the first light and in the optical path of the second light, so as to form illumination light with high luminous flux and high intensity. When using the illuminating device, the user can select different illuminating modes according to illumination requirements to improve the usage experience of the user.

In an embodiment of the present disclosure, the illuminating device generates beams using the hybrid light source 10. The adjustment mechanism 11 adjusts the light concentrating mechanism 13 to be in the optical path of the first light of the first converging element 8 or out of the optical path of the second light of the first converging element 8, so that the light passes through the first converging element 8, and then is focused on the GOBO 9 to form an illumination light spot with high luminous flux and high illuminance, and the illuminating device can satisfy requirements of high illuminance and high luminous flux output, thereby facilitating wide application of the illuminating device.

In an embodiment, the first light source 102 may be an LED light emitting element, and the first light may be LED beam.

The illuminating device further includes a light homogenizing mechanism 7. The light homogenizing mechanism 7 is arranged between the first light source 102 and the first converging element 8. The light homogenizing mechanism 7 includes at least two columns of lens arrays, and each column of the lens arrays is composed of a plurality of small unit fly-eye lenses. The focal point of each small unit lens in the first column of lens array coincides with a center of a corresponding small unit lens in the second column of lens array. The optical axes of the two columns of small unit lenses are parallel to each other.

The first column of lens arrays is configured to split the wide light beam formed by the first light source 102 into a plurality of narrow light beams. The narrow light beams emitted from the first column of lens arrays are incident to the second column of lens arrays. Each small unit lens of the second column of lens arrays makes the narrow light beams overlap each other and image on the illumination surface. The slight non-uniformity of each narrow light beam is compensated due to the mutual overlapping of the narrow light beams at the symmetrical positions, so that each point of the light spots formed by the second column of lens arrays onto the output surface is illuminated by the light emitted by all points of the first light source 102, thereby achieving the effect of uniform light spots, and improving the visual effect of the light emitted by the illuminating device.

In an embodiment, when the first light source 102 is used as the main light source of the illuminating device. The adjusting mechanism 11 is configured to adjust the light concentrating mechanism 13 to be located out of the optical path of the first light passing through the first converging element 8, so that the first light sequentially passes through the light homogenizing mechanism 7 and the first converging element and then is transmitted to the GOBO 9.

In an embodiment, the adjusting mechanism 11 includes an adjusting knob 12 and a rotating shaft 14. The adjusting knob 12 is fixed to the rotating shaft 14. The adjusting knob 12 is configured to drive the rotating shaft 14 to rotate, so that the light concentrating mechanism 13 moves along the extending direction of the rotating shaft 14.

In an embodiment, the adjusting knob 12 is configured to drive the rotating shaft 14 to rotate and adjust the position of the light concentrating mechanism 13, so that the light concentrating mechanism 13 is located in the optical path of the second light or out of the optical path of the first light. In an embodiment, the light concentrating mechanism 13 is arranged on the rotating shaft 14, and can slide up and down along the rotating shaft 14. The optical paths of the first light and the second light partially coincide. The light concentrating mechanism 13 can be moved along the extending direction of the rotating shaft 14 by the adjusting knob 12, so that the light concentrating mechanism 13 ingresses into the optical path of the second light or egresses from the optical path of the first light.

In an embodiment, the light concentrating mechanism 13 is a convex lens with a light concentrating effect. The light concentrating mechanism 13 moves along an extension direction of the rotating shaft 14. The extension direction of the rotating shaft 14 is perpendicular to the optical axis direction of the light concentrating mechanism 13, so that the light generated by the hybrid light source 10 can pass through the first converging element 8 and then enter the light concentrating mechanism 13 or be directly transmitted to the GOBO 9.

In an embodiment, the first light source 102 is an LED light source. The illuminating device includes an illuminating lens for receiving light. The beam generated by the hybrid light source 10 is irradiated into the external environment after passing through the illuminating lens, so as to achieve the lighting effect. An output surface is formed on the illuminating lens. The first light is irradiated to the output surface after passing through the GOBO 9, so as to form a second light spot on the output surface.

The first light is irradiated onto the light barrier 9 to form a first light spot on the GOBO 9. The shape of the second light spot is different from that of the first light spot. For example, when the first light spot formed by the first light generated by the first light source 102 on the GOBO 9 has a shape of a regular hexagon, the second light spot formed when the first light is irritated onto the output surface after passing through the light barrier 9 may have a circular shape. The GOBO 9 can change the shape of the light spot to improve the visual effect of the light emitted by the illuminating device and improve the user's usage experience.

In an embodiment, different array shapes formed by the light emitting chips of the first light source 102 result in various shapes of the first light spots. For example, when the first light source 102 is used as the main light source of the illuminating device, the first light spot formed by the beam on the GOBO 9 may have a shape of a hexagonal. In this case, the second light spot formed on the output surface after the beam passes through the GOBO 9 may have a circular shape, thereby improving the aesthetics of the illumination light spot output by the illuminating device.

Figure 2:
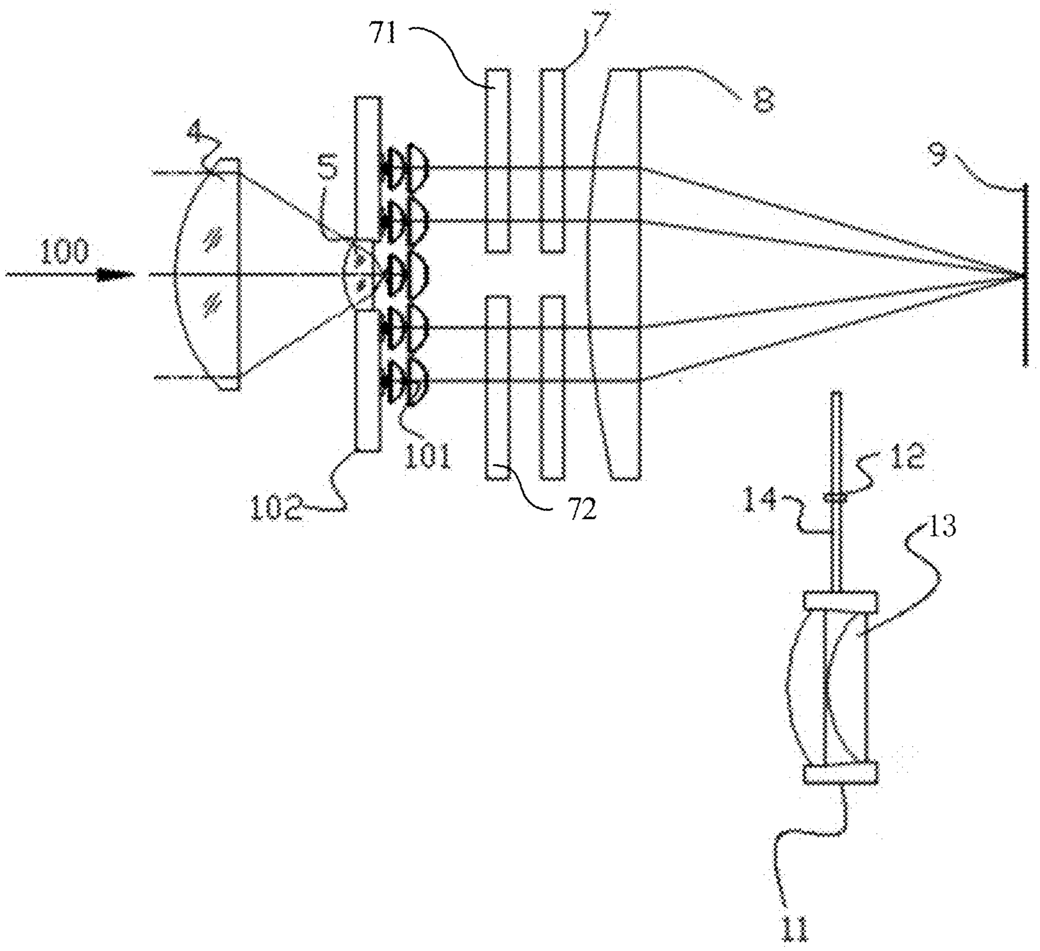
FIG. 2 is a schematic structural diagram of an illuminating device according to another embodiment of the present disclosure.

FIG. 2 is a schematic structural diagram of an illuminating device according to another embodiment of the present disclosure. As shown in FIG. 2, in this embodiment, the first light source 102 of the hybrid light source 10 is an LED light emitting element, the second light source 100 is a laser light source, and the second light is a laser beam.

In an embodiment, the LED light emitting element includes a substrate and a light emitting chip. The shape of the substrate includes, but is not limited to, a circle, a polygon, etc. A through hole is provided at the center of the substrate. The second light emitted by the second light source 100 is transmitted to the GOBO 9 via the through hole. The array of the light emitting chips is arranged at other positions except the through hole on the substrate.

In an embodiment, the illuminating device further includes a second converging element 4 arranged between the second light source 100 and the first light source 102. The second converging element 4 is configured to converge the second light emitted by the second light source 100 to the through hole, and the second light passes through the through hole and then is transmitted to the GOBO 9.

In an embodiment, the illuminating device includes a wavelength conversion element 5 arranged in the through hole for converting the second light of the first wavelength into the second light of the second wavelength.

In an embodiment, the wavelength conversion element 5 is arranged on the substrate via the through hole. The wavelength conversion element 5 may be a fluorescent filter and is configured to convert the second light of the first wavelength into the second light of the second wavelength to change the color and wavelength range of the second light and make it suitable for different lighting scenes. The fluorescent filter includes, but is not limited to, a yellow fluorescent filter, a green fluorescent filter or a red fluorescent filter. The wavelength conversion elements 5 with different filter ranges or conversion ranges may be selected according to actual utility requirements, and the filter ranges of the wavelength conversion elements 5 are not specifically limited herein.

In an embodiment, the adjusting mechanism 11 is configured to adjust the light concentrating mechanism 13 to be located in the optical path of the second light passing through the first converging element 8, so that the second light sequentially passes through the first converging element 8 and the light concentrating mechanism 13 and then is transmitted to the GOBO 9.

In an embodiment, when the second light source 100 is configured as the main light source of the illuminating device, the adjusting mechanism 11 is configured to adjust the light concentrating mechanism 13 to be located in the optical path of the first light passing through the first converging element 8. Since the laser beam is of a single light-emitting point, it is not necessary to use a light homogenizing element for scattering when using the laser light illuminate. The light homogenizing mechanism 7 has a plurality of light homogenizing panels as shown in FIG. 2. When the first light homogenizing panel 71 and the second light homogenizing panel 72 are arranged in parallel, a gap is provided between the first light homogenizing panel 71 and the second light homogenizing panel 72. The second light emitted by the second light source 100 passes through the through-hole and then the gap between the first light homogenizing panel 71 and the second light homogenizing panel 72, then sequentially passes through the first converging element 8 and the light concentrating mechanism 13, and finally is transmitted to the GOBO 9.

Further, in other embodiments, when using the second light source 100 as the main light source of the illuminating device, the adjusting mechanism 11 is further configured to adjust the light concentrating mechanism 13 to be located out of the optical path of the first light passing through the first converging element 8. In this case, the illuminating device may be have multiple brightness modes. For example, when the adjusting mechanism 11 adjusts the light concentrating mechanism 13 to be located in the optical path of the first light passing through the first converging element 8, the illumination light spot formed on the GOBO 9 has a higher illumination, and thus is in the first brightness mode; and when the adjusting mechanism 11 adjusts the light concentrating mechanism 13 to be located out of the optical path of the first light passing through the first converging element 8, the illumination light spot formed on the GOBO 9 has a lower illumination, and thus is in the second brightness mode, so that a user can select various kinds of brightness according to lighting requirements when using the illuminating device, thereby improving the user's usage experience.

In an embodiment, the hybrid light source 10 includes a collimating mechanism 101. The collimating mechanism 101 is arranged between the first light source 102 and the first converging element 8. A focal plane of the collimating mechanism 101 is in the optical path of the first light and/or the second light, and the collimating mechanism 101 is configured to adjust a divergence angle of the first light and/or the second light.

The collimating mechanism 101 is arranged at the side of the first light source 102 away from the second light source 100, or the collimating mechanism 101 is arranged in the optical path of the first light emitted by the first light source 102. The collimating mechanism 101 is configured to collect the first light emitted by the first light source 102 and adjust the divergence angle of the first light. The divergent first light becomes parallel first light after passing through the collimating mechanism 101. The second light emitted by the second light source 100 is focused on the focal plane of the collimating mechanism 101 after passing through the through hole, and the collimating mechanism 101 adjusts the divergence angle of the second light, thereby improving the lighting efficiency of the illuminating device.

In an embodiment, the illuminating device may also have the third illuminating mode. In the third illuminating mode, the first light source 102 and the second light source 100 may be simultaneously used as the light source. In this case, the position of the light concentrating mechanism 13 may be adjusted by controlling the adjustment mechanism 11. The illuminating device can configure the illuminating mode according to the selection of the illumination light source, the focusing intensity and the like, so as to satisfy the requirements of a user for illuminating device with different intensities and different luminous fluxes, thereby improving the use's usage experience.

The above are merely embodiments of the present disclosure, but not intended to limit the scope of the present disclosure. Any equivalent structure or any equivalent process transformation made using the specification and the accompanying drawings of the present disclosure, or directly or indirectly applied in other related technical fields shall fall within the protection scope of the present disclosure.

What is claimed is:

1. An illuminating device, comprising:

a first light source configured to generate a first light;

a second light source configured to generate a second light;

a first converging element provided in an optical path of the first light and an optical path of the second light;

an adjusting mechanism;

a light concentrating mechanism, wherein the light concentrating mechanism is provided on the adjusting mechanism, the adjusting mechanism is configured to adjust a position of the light concentrating mechanism, and the light concentrating mechanism is located in the optical path of the second light passing through the first converging element or located out of the optical path of the first light passing through the first converging element;

a second converging element;

a goes before optics (GOBO), wherein the first light is transmitted to the GOBO through the first converging element, or the second light is transmitted to the GOBO through the first converging element and the light concentrating mechanism, and a wavelength conversion element, wherein the first light source comprises a substrate and a light-emitting chip, the light-emitting chip is arranged on the substrate, the substrate is provided with a through hole, and the second light is transmitted to the GOBO via the through hole; and wherein the wavelength conversion element is arranged on the substrate via the through hole; and wherein the second converging element is arranged between the second light source and the first light source, and is configured to converge the second light emitted by the second light source to the wavelength conversion element in the through hole.

2. The illuminating device according to claim 1, wherein the illuminating device comprises a light homogenizing mechanism provided between the first light source and the first converging element, and the first light sequentially passes through the light homogenizing mechanism and the first converging element.

3. The illuminating device according to claim 2, wherein the adjusting mechanism is configured to adjust the light concentrating mechanism to be located out of the optical path of the first light passing through the first converging element, so that the first light sequentially passes through the first converging element and the light concentrating mechanism, and then is transmitted to the GOBO.

4. The illuminating device according to claim 2, wherein the adjusting mechanism comprises an adjusting knob and a rotating shaft, the adjusting knob is fixed to the rotating shaft, and the adjusting knob is configured to drive the rotating shaft to rotate, so that the light concentrating mechanism is located in the optical path of the second light or located out of the optical path of the first light.

5. The illuminating device according to claim 4, wherein the light concentrating mechanism moves along an extending direction of the rotating shaft, and the extending direction of the rotating shaft is perpendicular to an optical axis direction of the light concentrating mechanism.

6. The illuminating device according to claim 2, wherein the adjusting mechanism is configured to adjust the light concentrating mechanism to be located in an optical path of the second light passing through the first converging element, so that the second light sequentially passes through the first converging element and the light concentrating mechanism, and then is transmitted to the GOBO.

7. The illuminating device according to claim 2, wherein the illuminating device comprises a collimating mechanism provided between the first light source and the first converging element, the collimating mechanism has a focal plane located in the optical path of the first light and/or in the optical path of the second light, and the collimating mechanism is configured to adjust a divergence angle of the first light and/or the second light.

8. The illuminating device according to claim 1, wherein the first light is irradiated to the GOBO to form a first light spot, the first light passes through the GOBO and is irradiated to an output surface to form a second light spot, and a shape of the second light spot is different from a shape of the first light spot.

* * * * *